(12) United States Patent
Gunn (10) Patent No.: US 10,780,995 B1
(45) Date of Patent: Sep. 22, 2020

(54) SYSTEM AND PROCESS FOR PROVIDING HELICOPTER INSTRUMENTS ON A TABLET IN DIGITAL FORM DURING EXTERNAL LOAD OPERATIONS

(71) Applicant: Jonathan Richard Gunn, Camarillo, CA (US)

(72) Inventor: Jonathan Richard Gunn, Camarillo, CA (US)

( * ) Notice: Subject to any disclaimer, the term of this patent is extended or adjusted under 35 U.S.C. 154(b) by 80 days.

(21) Appl. No.: 16/255,062

(22) Filed: Jan. 23, 2019

Related U.S. Application Data (60) Provisional application No. 62/795,387, filed on Jan. 22, 2019, provisional application No. 62/620,864, filed on Jan. 23, 2018.

(51) Int. Cl.
| | |
|---|---|
| *B64F 1/36* | (2017.01) |
| *H04B 7/185* | (2006.01) |
| *G05D 1/08* | (2006.01) |
| *B64F 1/00* | (2006.01) |
| *G06F 9/455* | (2018.01) |
| *G06F 9/451* | (2018.01) |
| *G06F 3/048* | (2013.01) |
| *B64C 27/04* | (2006.01) |

(52) U.S. Cl.
CPC .............. *B64F 1/364* (2013.01); *B64C 27/04* (2013.01); *B64F 1/007* (2013.01); *G05D 1/0858* (2013.01); *G06F 3/048* (2013.01); *G06F 9/451* (2018.02); *G06F 9/455* (2013.01); *H04B 7/18506* (2013.01)

(58) Field of Classification Search
CPC .. B64F 1/364; B64F 1/007; B64F 1/36; B64F 1/00; G06F 9/451; G06F 3/048; G06F 9/455; B64C 27/04; G05D 1/0858; H04B 7/18506; H04B 7/185; G05C 1/08
See application file for complete search history.

(56) References Cited

U.S. PATENT DOCUMENTS

| | | |
|---|---|---|
| 8,344,870 B2 | 1/2013 | Evans |
| 9,973,263 B2 | 5/2018 | Hathaway |
| 2011/0175754 A1 | 7/2011 | Karpinsky |
| 2018/0056787 A1* | 3/2018 | Bonhoure .............. B60K 37/06 |

* cited by examiner

*Primary Examiner* — Robert L Deberadinis
(74) *Attorney, Agent, or Firm* — Plager Schack LLP; Mark H. Plager; Stephen Hallberg (57) ABSTRACT

A system providing helicopter instruments on a tablet in digital form for external load operations is disclosed. The system includes a data collect system/device that retrieves data from the drive train of the helicopter and wirelessly transmits the data to a tablet computing device with a tablet app running to visually output gauges and real-time operational helicopter readings so as not to exceed operating limits when the pilot is out of a line of sight of the instrument panel in the helicopter, such as when engaged in external load operations. The system and tablet app implementation supports many different helicopter variants and the tablet is easily mounted in any helicopter or moved from one helicopter to another.

10 Claims, 6 Drawing Sheets

SYSTEM AND PROCESS FOR PROVIDING HELICOPTER INSTRUMENTS ON A TABLET IN DIGITAL FORM DURING EXTERNAL LOAD OPERATIONS

CLAIM OF BENEFIT TO PRIOR APPLICATIONS

This application claims benefit to U.S. Provisional Patent Application 62/620,864, entitled "Remote helicopter rotor and engine instrument display on a custom tablet App via Bluetooth," filed Jan. 23, 2018, and to U.S. Provisional Patent Application 62/795,387, entitled "A real time Data Collection System and engine cycle counter that records and monitors aircraft usage from an analogue or digital source and which can transmit the data in real time via wireless methods," filed Jan. 22, 2019. The U.S. Provisional Patent Applications 62/620,864 and 62/795,387 are incorporated herein by reference.

BACKGROUND

Embodiments of the invention described in this specification relate generally to dashboards and instrument/gauge displays, and more particularly, to a helicopter gauge data collection, wireless distribution, and real-time visual display system and a process for preventing a helicopter pilot from exceeding operating limits due to limited viewing of native helicopter instrument panel(s) by providing real-time helicopter gauge data on a tablet in digital form during external load operations.

In a helicopter, the conventional display of the engine and air frame instruments are located on the instrument panel. However, pilots cannot always look at the instrument panel. As such, pilots risk exceeding operating limits when not looking at the instrument panel. For example, when looking at the external load, which is located near the pilot's view, the instrument panel may not be visible (entirely or in part) to the pilot. Thus, during helicopter external load operations, it is possible for pilots to exceed operating limits due to limited viewing of the instrument panel.

Moving gauges for better visibility or installing new conventional analogue gauges requires extensive cost and some helicopters do not have the provisions to mount the analogue gauges.

Therefore, what is needed is a way to provide remote and mobile digital instrument display of instrument gauges to prevent a pilot from exceeding helicopter operating limits when looking at the external load during external load operations for any of several different helicopter variants or interior designs.

BRIEF DESCRIPTION

A novel helicopter gauge data collection, wireless distribution, and real-time visual display system and a novel process for preventing a helicopter pilot from exceeding operating limits due to limited viewing of native helicopter instrument panel(s) by providing real-time helicopter gauge data on a screen of a tablet computing device in digital form during external load operations are disclosed.

In some embodiments, the process for preventing a helicopter pilot from exceeding operating limits due to limited viewing of native helicopter instrument panel(s) by providing real-time helicopter gauge data on a tablet in digital form during external load operations is a computer-implemented process. In some embodiments, the process for preventing a helicopter pilot from exceeding operating limits due to limited viewing of native helicopter instrument panel(s) by providing real-time helicopter gauge data on a tablet in digital form during external load operations includes a plurality of steps comprising receiving a stream of digital helicopter operating data, transforming the digital helicopter operating data to visual representations of digitized helicopter gauges, and visually outputting the digitized gauges with the digital helicopter operating data dynamically displayed in real-time as gauge readings of the digitized gauges.

In some embodiments, the helicopter gauge data collection, wireless distribution, and real-time visual display system comprises a data collection device that interfaces with and collects data from a drive train of a helicopter, a data collection Bluetooth module that is associated with the data collection device, a tablet computing device that includes a tablet screen, a tablet processor, and a custom tablet app that represents digital helicopter gauge data by visually outputting digitized helicopter gauges that dynamically display the digital helicopter gauge data in real-time when a pilot of the helicopter is performing external load operations, and a data recipient Bluetooth module that is embedded in the tablet computing device and connects to the data collection Bluetooth module to receive a stream of the digital helicopter gauge data when the data collection device wirelessly transmits the collected data via the data collection Bluetooth module.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel helicopter gauge data collection, wireless distribution, and real-time visual display system and a novel process for preventing a helicopter pilot from exceeding operating limits due to limited viewing of native helicopter instrument panel(s) by providing real-time helicopter gauge data on a tablet in digital form during external load operations.

In some embodiments, the process for preventing a helicopter pilot from exceeding operating limits due to limited viewing of native helicopter instrument panel(s) by providing real-time helicopter gauge data on a tablet in digital form during external load operations is a computer-implemented process. In some embodiments, the process for preventing a helicopter pilot from exceeding operating limits due to limited viewing of native helicopter instrument panel(s) by providing real-time helicopter gauge data on a tablet in digital form during external load operations includes a plurality of steps comprising receiving a stream of digital helicopter operating data, transforming the digital helicopter operating data to visual representations of digitized helicopter gauges, and visually outputting the digitized gauges with the digital helicopter operating data dynamically displayed in real-time as gauge readings of the digitized gauges. In some embodiments, the plurality of steps of the process for preventing a helicopter pilot from exceeding operating limits due to limited viewing of native helicopter instrument panel(s) by providing real-time helicopter gauge data on a tablet in digital form during external load operations further comprises requesting Bluetooth connection from a tablet computing device to a helicopter data collection system, initiating a handshake connection with the helicopter data collection system by the tablet computing device, opening a new data stream by the tablet computing device to receive real-time control variable data from the data collection system, determining whether there is data that is incoming and continuing to check whether data is incoming until incoming data is received, receiving the stream of digital helicopter operating data at the tablet computing device, transforming the digital helicopter operating data by the tablet computing device to visual representations of digitized helicopter gauges, visually outputting the digitized gauges onto the tablet screen with the digital helicopter operating data dynamically displayed in real-time as gauge readings of the digitized gauges, and continuing to receive and transform the stream of digital helicopter operating data into visual representations of digitized helicopter gauges to visually output onto the tablet screen while displaying the gauge readings of the digitized gauges in real-time until a shutdown event is detected comprising one of a tablet computing device shutdown event and a custom tablet app shutdown event.

In some embodiments, the helicopter gauge data collection, wireless distribution, and real-time visual display system comprises a data collection device, a tablet computing device, and wireless data transceivers. In some embodiments, the wireless data transceivers comprise wireless Bluetooth modules. In some embodiments, the helicopter gauge data collection, wireless distribution, and real-time visual display system comprises a data collection device that interfaces with and collects data from a drive train of a helicopter, a data collection Bluetooth module that is associated with the data collection device, a tablet computing device that includes a tablet screen, a tablet processor, and a custom tablet app that represents digital helicopter gauge data by visually outputting digitized helicopter gauges that dynamically display the digital helicopter gauge data in real-time when a pilot of the helicopter is performing external load operations, and a data recipient Bluetooth module that is embedded in the tablet computing device and connects to the data collection Bluetooth module to receive a stream of the digital helicopter gauge data when the data collection device wirelessly transmits the collected data via the data collection Bluetooth module.

For purposes of the inventive embodiments described in this specification, the term "data collection device" is synonymous with the term "data collection system" and mean the same thing in connection with embodiments of the helicopter gauge data collection, wireless distribution, and real-time visual display system and the process for preventing a helicopter pilot from exceeding operating limits due to limited viewing of native helicopter instrument panel(s) by providing real-time helicopter gauge data on a tablet in digital form during external load operations.

As stated above, existing helicopter instrumentation panels are not always clearly visible to a pilot during helicopter external load operations, which puts the pilot in jeopardy of exceeding operating limits due to limited viewing of the instrument panel. Embodiments of the helicopter gauge data collection, wireless distribution, and real-time visual display system and the process for preventing a helicopter pilot from exceeding operating limits due to limited viewing of native helicopter instrument panel(s) by providing real-time helicopter gauge data on a tablet in digital form during external load operations described in this specification solve such problems by collecting drive train data by way of a data collection device/system. The collected drive train data is then transmitted via Bluetooth to the tablet computing device. The instruments are represented on a screen of the tablet computing device in digital form so that the pilot can view the tablet while viewing the external load.

Embodiments of the helicopter gauge data collection, wireless distribution, and real-time visual display system and the process for preventing a helicopter pilot from exceeding operating limits due to limited viewing of native helicopter instrument panel(s) described in this specification differ from and improve upon currently existing options. In particular, there is no existing system representing drive train data on a tablet for helicopters. In contrast, the helicopter gauge data collection, wireless distribution, and real-time visual display system and the process for preventing a helicopter pilot from exceeding operating limits due to limited viewing of native helicopter instrument panel(s) provide for the collection of helicopter drive train data (via the data collection device in connection with the helicopter drive train interface(s)), the transformation of the collected drive train data into analogue gauge-displayable real-time instrument graphics, and the display of the analogue gauge-displayable real-time instrument graphics on a screen of the tablet computing device, which is positioned for pilot's visual observation when engaging external load operations.

In addition, these embodiments improve upon the currently existing options due to the cost of installation of conventional gauges, as well as not having the provision to install analogue gauges or available aviation certification approvals to install. In contrast, mobile tablet computing device implementation of the helicopter gauge data collection, wireless distribution, and real-time visual display system and the process for preventing a helicopter pilot from exceeding operating limits due to limited viewing of native helicopter instrument panel(s) of the present disclosure can be designed for many different helicopter variants and easily mounted and moved from one helicopter to another.

Figure 1:
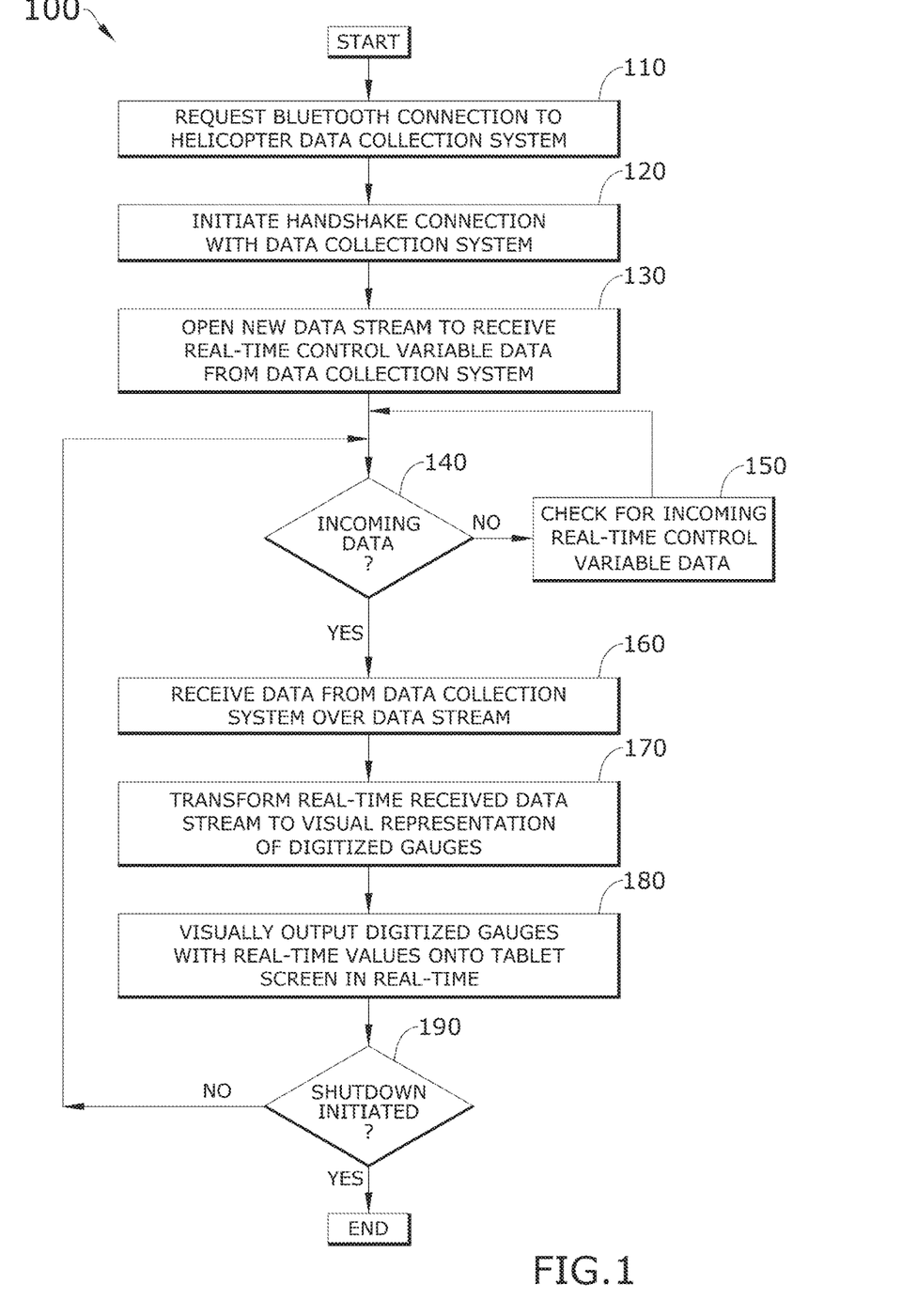
FIG. 1 conceptually illustrates a process for preventing a helicopter pilot from exceeding operating limits due to limited viewing of native helicopter instrument panel(s) by providing real-time helicopter gauge data on a tablet in digital form during external load operations in some embodiments.

By way of example, FIG. 1 conceptually illustrates a process for preventing a helicopter pilot from exceeding operating limits due to limited viewing of native helicopter instrument panel(s) by providing real-time helicopter gauge data on a tablet in digital form during external load operations 100. As shown in this figure, the process for preventing a helicopter pilot from exceeding operating limits due to limited viewing of native helicopter instrument panel(s) by providing real-time helicopter gauge data on a tablet in digital form during external load operations 100 starts by user interaction with the custom tablet app in order to wirelessly connect to the data collection system that is deployed on the helicopter and interfaces with the drive train of the helicopter. Thus, the process for preventing a helicopter pilot from exceeding operating limits due to limited viewing of native helicopter instrument panel(s) by providing real-time helicopter gauge data on a tablet in digital form during external load operations 100 requests a Bluetooth connection (at 110) to the data collection system onboard the helicopter. The user may be a pilot in the cockpit of the helicopter or the user may be a pilot or a mechanic or other helicopter authority testing the helicopter operating status from a non-flight ground position ground position. When testing the helicopter operating status from a non-flight ground position, the user may be testing one helicopter among several helicopters positioned nearby for similar operating testing. As such, the user may select a Bluetooth connection from among several available Bluetooth connections that could be used for real-time data communication in relation to the other nearby helicopters.

After requesting the Bluetooth connection (or after selecting the subject helicopter Bluetooth connection from among a list of the several available Bluetooth connections of the other helicopters), the user would provide any login credentials which the helicopter gauge data collection, wireless distribution, and real-time visual display system requires or for which the custom tablet app is configured to prompt the user. Examples of user login credentials include, without limitation, username/password, two-factor authentication methods of validating the user (e.g., something the user knows, such as a previously created username/password, and something the user has, such as a mobile phone, validated by entering a code texted to a phone number of the phone the user has), biometric input (e.g., fingerprint via fingerprint sensor on tablet computing device), etc. Upon successfully authenticated login or other such confirmed user validation, the process for preventing a helicopter pilot from exceeding operating limits due to limited viewing of native helicopter instrument panel(s) by providing real-time helicopter gauge data on a tablet in digital form during external load operations 100 initiates a handshake connection (at 120) between the tablet computing device and the data collection system deployed in the helicopter.

Next, the process for preventing a helicopter pilot from exceeding operating limits due to limited viewing of native helicopter instrument panel(s) by providing real-time helicopter gauge data on a tablet in digital form during external load operations 100 opens a new data stream (at 130) between Bluetooth modules on each of the tablet computing device and the data collection system, in order to receive real-time helicopter control variable data from the data collection system deployed on the helicopter. The real-time helicopter control variable data is based on the helicopter drive train data that is concurrently and continuously being collected by the data collection system. In some embodiments, the real-time helicopter control variable data is converted into a digital format from an analogue format collected from the drive train of the helicopter by the data collection system (i.e., when the helicopter is a so-called 'analogue helicopter'). Otherwise, when the data collection system collected drive train data from the helicopter in digital format, then wireless transmission of the digital data via Bluetooth across the new data stream can occur without conversion.

In some embodiments, the process for preventing a helicopter pilot from exceeding operating limits due to limited viewing of native helicopter instrument panel(s) by providing real-time helicopter gauge data on a tablet in digital form during external load operations 100 determines (at 140) whether there is any incoming data over the new data stream. In some embodiments, the custom tablet app starts to check for incoming data immediately upon opening the new data stream. When there is no incoming data over the new data stream, the process for preventing a helicopter pilot from exceeding operating limits due to limited viewing of native helicopter instrument panel(s) by providing real-time helicopter gauge data on a tablet in digital form during external load operations 100 checks again for incoming real-time control variable data (at 150), reverting back to the step for determining (at 140) whether there is any incoming data. The process for preventing a helicopter pilot from exceeding operating limits due to limited viewing of native helicopter instrument panel(s) by providing real-time helicopter gauge data on a tablet in digital form during external load operations 100 continues this cycle of checking for incoming real-time control variable data (at 150) and determining (at 140) whether there is any incoming data until incoming data is detected.

Thus, when there is incoming data across the new data stream, the process for preventing a helicopter pilot from exceeding operating limits due to limited viewing of native helicopter instrument panel(s) by providing real-time helicopter gauge data on a tablet in digital form during external load operations 100 then receives the incoming data (at 160) from the data collection system over the new data stream. In some embodiments, the custom tablet app is configured to exclusively use a portion of random access memory (RAM) of the tablet computing device that allows the received data to be read immediately upon receipt, buffered for a small time duration after reading (in order to allow backward error correction as may be needed), and then transformed into visual graphics that show real-time gauge readings which demonstrate the operating levels of the helicopter in real-time. The received data can be discarded or persistently stored, depending on the needs of the user. In some embodiments, the custom tablet app allows the user to configure storage settings, such as how the custom tablet app handles received/transformed data (save or discard?). In some embodiments, when the received/transformed data is persistently stored, a data trail is available after the real-time visual output, such that the pilot or other users can display the gauge readings in a playback of operational gauge readings during one or more external load operations during a flight, such as when a problem occurred, or operational limits were exceeded, a crash occurred, or other problematic events were encountered.

Regardless of whether the data is stored permanently on the tablet computing device or not, the point is to provide the real-time gauge levels in a visual format on the screen of the tablet while the pilot is engaged in external load operations which may put them in a position in which the instrument panel is not visible. This is described next. Specifically, the process for preventing a helicopter pilot from exceeding operating limits due to limited viewing of native helicopter instrument panel(s) by providing real-time helicopter gauge data on a tablet in digital form during external load operations 100 transforms (at 170) the real-time received data stream into a visual representation of the digitized gauges. In some embodiments, the process for preventing a helicopter pilot from exceeding operating limits due to limited viewing of native helicopter instrument panel(s) by providing real-time helicopter gauge data on a tablet in digital form during external load operations 100 then visually outputs the digitized gauges with real-time values (at 180) onto the tablet screen in real-time.

To provide any effective help to the pilot, the process for preventing a helicopter pilot from exceeding operating limits due to limited viewing of native helicopter instrument panel(s) by providing real-time helicopter gauge data on a tablet in digital form during external load operations 100 must be able to cycle through the above-mentioned steps in repeated fashion and output real-time data in similarly fast continuous manner. The configuration of RAM on the tablet assists in the speed of displaying the real-time data on the screen of the tablet computing device, thereby allow the process for preventing a helicopter pilot from exceeding operating limits due to limited viewing of native helicopter instrument panel(s) by providing real-time helicopter gauge data on a tablet in digital form during external load operations 100 to continue to cycle back and receive more data.

Thus, the process for preventing a helicopter pilot from exceeding operating limits due to limited viewing of native helicopter instrument panel(s) by providing real-time helicopter gauge data on a tablet in digital form during external load operations 100 then determines (at 190) whether shutdown of the custom tablet app is initiated. When the user shuts down the custom tablet app, the processing stops, causing the process for preventing a helicopter pilot from exceeding operating limits due to limited viewing of native helicopter instrument panel(s) by providing real-time helicopter gauge data on a tablet in digital form during external load operations 100 to end. On the other hand, when shutdown of the custom tablet app has not been initiated, then the process for preventing a helicopter pilot from exceeding operating limits due to limited viewing of native helicopter instrument panel(s) by providing real-time helicopter gauge data on a tablet in digital form during external load operations 100 returns to the step for determining (at 140) whether there is more incoming data streaming via the new data stream. The process for preventing a helicopter pilot from exceeding operating limits due to limited viewing of native helicopter instrument panel(s) by providing real-time helicopter gauge data on a tablet in digital form during external load operations 100 continues as noted above, at least until a shutdown of the custom tablet app is initiated, at which time processing ends. In this way, the custom tablet app-when running on the tablet computing device and receiving digital data wirelessly from the data collection system (in connection with the drive train of the helicopter)—is able to provide remote and mobile digital helicopter instrument display of helicopter instrument gauges to prevent a pilot from exceeding helicopter operating limits when looking at the external load during external load operations, and to do so for any of several different helicopter variants.

The helicopter gauge data collection, wireless distribution, and real-time visual display system and the process for preventing a helicopter pilot from exceeding operating limits due to limited viewing of native helicopter instrument panel(s) by providing real-time helicopter gauge data on a tablet in digital form during external load operations of the present disclosure may be comprised of the following elements. This list of possible constituent elements is intended to be exemplary only and it is not intended that this list be used to limit the helicopter gauge data collection, wireless distribution, and real-time visual display system and the process for preventing a helicopter pilot from exceeding operating limits due to limited viewing of native helicopter instrument panel(s) of the present application to just these elements. Persons having ordinary skill in the art relevant to the present disclosure may understand there to be equivalent elements that may be substituted within the present disclosure without changing the essential function or operation of the helicopter gauge data collection, wireless distribution, and real-time visual display system and the process for preventing a helicopter pilot from exceeding operating limits due to limited viewing of native helicopter instrument panel(s) by providing real-time helicopter gauge data on a tablet in digital form during external load operations.

1. Data Collection System—the data collection system connects to the helicopter drive-train signals (via one or more helicopter drive train interface(s) that include either or both of physically wired and/or wireless interface connections to collect digital data transmitted via the drive-train signals) and monitors these signals against preassigned limits (known also as threshold limits for each particular helicopter among several helicopter variants) and alerts the pilot via sensory alarm(s), such as by audio tones (or audible alerts) and/or visual beacons or flashing (or visual alerts). Along with collecting and monitoring the digital signals from the drive train of the helicopter (and possibly sound audible alerts and/or flashing visual alerts when operating limits have exceeded threshold limits), the data collection system of some embodiments concurrently transmits the digital signal data to the tablet computing device via Bluetooth (after turning on the Bluetooth function selection of coupling devices, handshake, password) for transformation of the digital signal data and subsequent visual output onto the screen of the tablet, to appear as gauges and dials in real-time. In addition to the audio tones and/or visual alerts that the data collection system provides to the pilot, in some embodiments, the data collection system also provides engine cycle counting and post flight exceedance and usage data, which can be wirelessly transmitted to mobile devices including smart phones and/or tablet devices. In some embodiments, the engine cycle counting feature is implemented as a module, sub-routine, or function of software that runs on a processor of the data collection system. In some embodiments, the engine cycle counting module is configured to accrue engine cycles according to an engine manufacture algorithm that is specific for the helicopter engine used in the operating helicopter. In some embodiments, the data collection system provides third party connection to satellite and/or cellular communication systems, in addition to the nearby wireless Bluetooth support. In some embodiments, the data collection system is supplied with comprehensive graphing software to provide representations of the exceedance and usage data in a graphical form when sent to the tablet computing device and visually output onto the tablet screen. In some embodiments, the data collection system also sends real-time accrual of engine cycle counts for visual output on the screen of the tablet.

2. Bluetooth—wireless data transceiver Bluetooth modules are included at the data collection system and at a data recipient (i.e., a tablet computing device, described next) and are configured to automatically transmit digital signals with the data from the data collection system and automatically receive the data carried by the digital signals at the data recipient (i.e., tablet). Specifically, a wireless data collection Bluetooth module is configured to transmit digital data collected by the Data Collection System (e.g., the wireless data collection Bluetooth module acts in this function as a wireless data transmitter Bluetooth module, but is also capable of receiving data) to the data recipient Bluetooth module (acting in this function as a wireless data receiver Bluetooth module, but also capable of transmitting data) of the data recipient (i.e., the tablet computing device).

3. Tablet computing device—the tablet computing device includes a tablet screen (which can display graphics and can also act as a touch-sensitive screen that receives gesture commands via user finger or stylus input) and a tablet processing unit (or mobile processor, hereinafter referred to as the tablet "processor"). The tablet computing device runs a custom mobile application program (or custom tablet application program, either of which is hereinafter also referred to as the "custom tablet app" or the "custom mobile app") on the processor. The custom tablet app connects to the wireless data collection Bluetooth module to receive digital signals from the data collection system and, after some processing, visually outputs graphical representations of the digital data in the form of helicopter gauges and instrumentation (such as the pilot would normally see when in the line of sight of the helicopter's instrument panel). The received digital signals from the wireless data collection Bluetooth module include the real-time data that the data collection system retrieves from the helicopter during external load operations (which often will compromise the pilot's field of view and obstructing, at least partially, if not entirely, the line of sight between the pilot and the instrument panel of the helicopter). The received digital signals, when received by the tablet, are then used to control identical digital representations of the analogue instruments in the custom tablet app and control the needle or dial movement (that is, the needle or dial of the gauge representation, where needle and dial are hereinafter referred to collectively or individually as "dial", "gauge dial", "needle", or "gauge needle") that is displayed to the pilot and points to gauge values around the gauge representation (on the tablet screen). In particular, the tablet computing device is a mobile tablet computing device that is not permanently mounted to the helicopter. As such, the tablet computing device can be moved around inside the helicopter (or even outside the helicopter when the helicopter is grounded but is being engaged in operations for maintenance, safety inspection, or quality assurance testing purposes) to allow the pilot to position the tablet computing device at any location, position, or anywhere in which the tablet screen would be positioned and angled within the field of view and the line of sight of the pilot. Thus, when the pilot is performing external load operations, the pilot will often gaze out the side window which invariably shifts the pilot's field of view away from the helicopter's internal instrument panel. Even if the pilot has a peripheral view of the instrument panel when his or her field of view has shifted, the direct line of sight of the pilot would not be on the instrument panel, but would be focused on the external, outside view related to the external load operations. On the other hand, when the tablet computing device and tablet screen is positioned at a location that is sufficiently within the pilot's field of view when the pilot's gaze changes for the external load operations, then the pilot will be able to maintain attention on the operational gauge readings so as not to exceed the helicopter's operational limits.

To make the helicopter gauge data collection, wireless distribution, and real-time visual display system and the process for preventing a helicopter pilot from exceeding operating limits due to limited viewing of native helicopter instrument panel(s) by providing real-time helicopter gauge data on a tablet in digital form during external load operations of the present disclosure, a person may design, develop, and manufacture (as well as test and deploy) a computer controlled data collection system that is capable of collecting drive train data from the helicopter. The data collection system designed, developed, and manufactured may convert analogue signals to digital form or, when the drive train data is already in digital form, may format the collected data in a form that can be wirelessly transmitted via Bluetooth and received at the tablet computing device for further handling and real-time output of the information relayed via the drive train data. The person may design, develop (and code), build, and install a custom mobile tablet app that understands the received digital data in order to perform one or more transformations of the data to prepare for visual output of representations on visually rendered and output digital gauges that control the real-time display of operating values by dials of the digital gauges. When made in this way, a pilot can deploy a tablet computing device with the custom mobile tablet app installed and the helicopter with the data collection system (which is also referred to as a data collection device) connected to the helicopter drive train in a place that allows the pilot to see the real-time dynamically changing values of the gauges on the screen of the tablet. In a preferred deployment, the tablet computing device is mounted in a place next to the door opening where the pilot can simultaneously view the external load and the custom mobile tablet app on the screen of the tablet.

Figure 2:
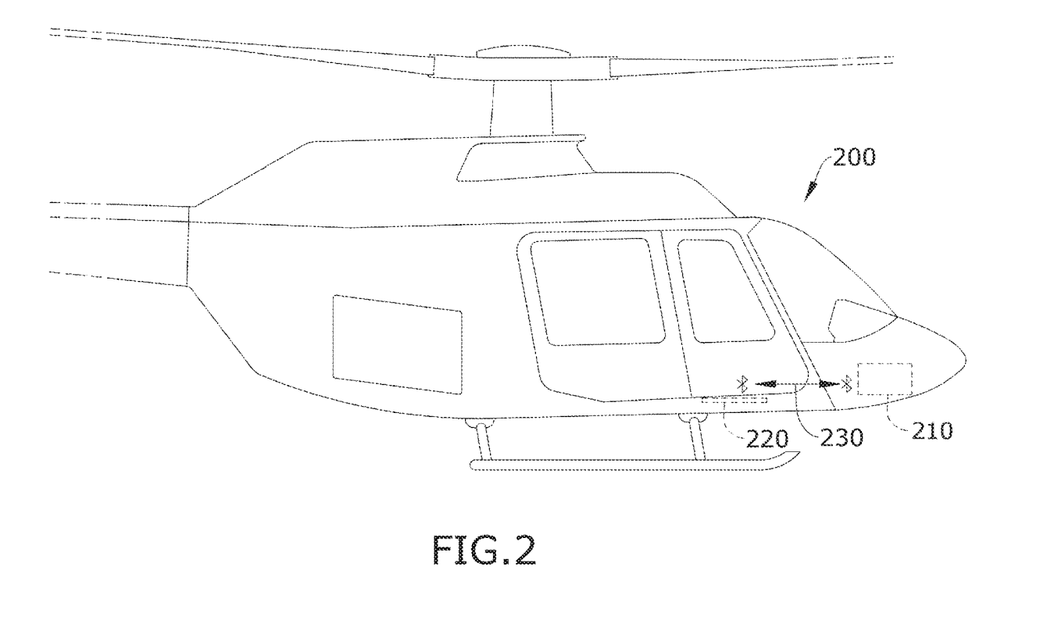
FIG. 2 conceptually illustrates a helicopter gauge data collection, wireless distribution, and real-time visual display system deployed in an exemplary helicopter in some embodiments.

By way of example, FIG. 2 conceptually illustrates a helicopter gauge data collection, wireless distribution, and real-time visual display system deployed in an exemplary helicopter 200. As shown in this figure, the helicopter gauge data collection, wireless distribution, and real-time visual display system includes a data collection system 210 and a tablet computing device 220, which are communicably connected via wireless Bluetooth connection 230.

Figure 3:
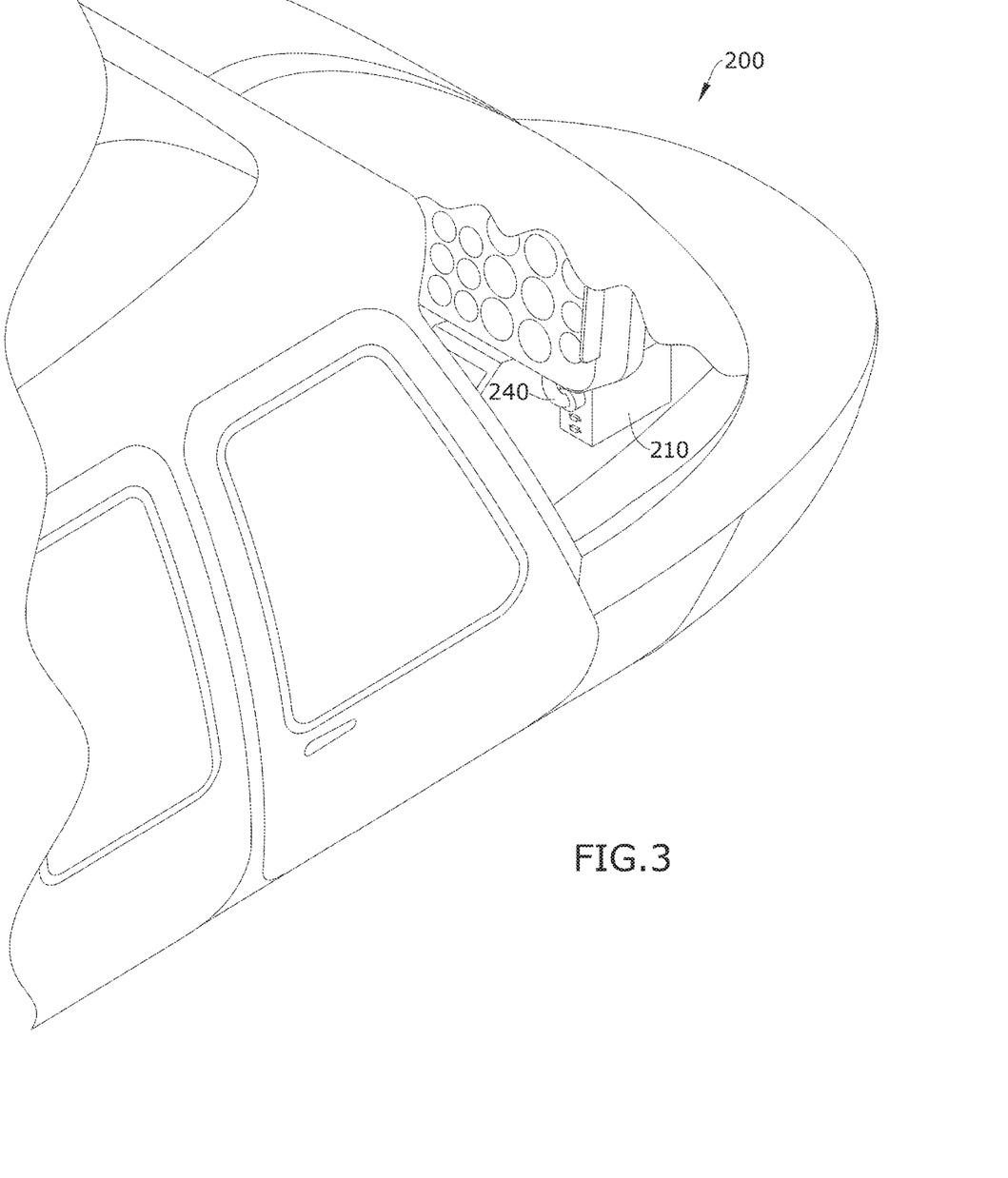
FIG. 3 conceptually illustrates a view of a data collection system in some embodiments of the helicopter gauge data collection, wireless distribution, and real-time visual display system deployed in the exemplary helicopter.

Now turning to another example, FIG. 3 conceptually illustrates a view of a data collection system 210 of the helicopter gauge data collection, wireless distribution, and real-time visual display system deployed in the exemplary helicopter 200. As shown in this figure, the view of the data collection system 210 demonstrates a data collection system connection cable 240 that provides a physical wired connection between the data collection system 210 and a drive train (encapsulated within the helicopter, e.g., behind the instrument panel, but not shown in this Figure) of the exemplary helicopter 200. In some embodiments, the data collection system includes an analogue to digital converter (ADC) for use in analogue helicopters with native helicopter drive train data in analogue form (which is then converted to digital form). In some embodiments, the data collection system comprises a digital data collection system for use in digital helicopters with native helicopter drive train data in digital form (which is then wirelessly transferred, via Bluetooth, to the tablet computing device as incoming data for the custom tablet app).

Figure 4:
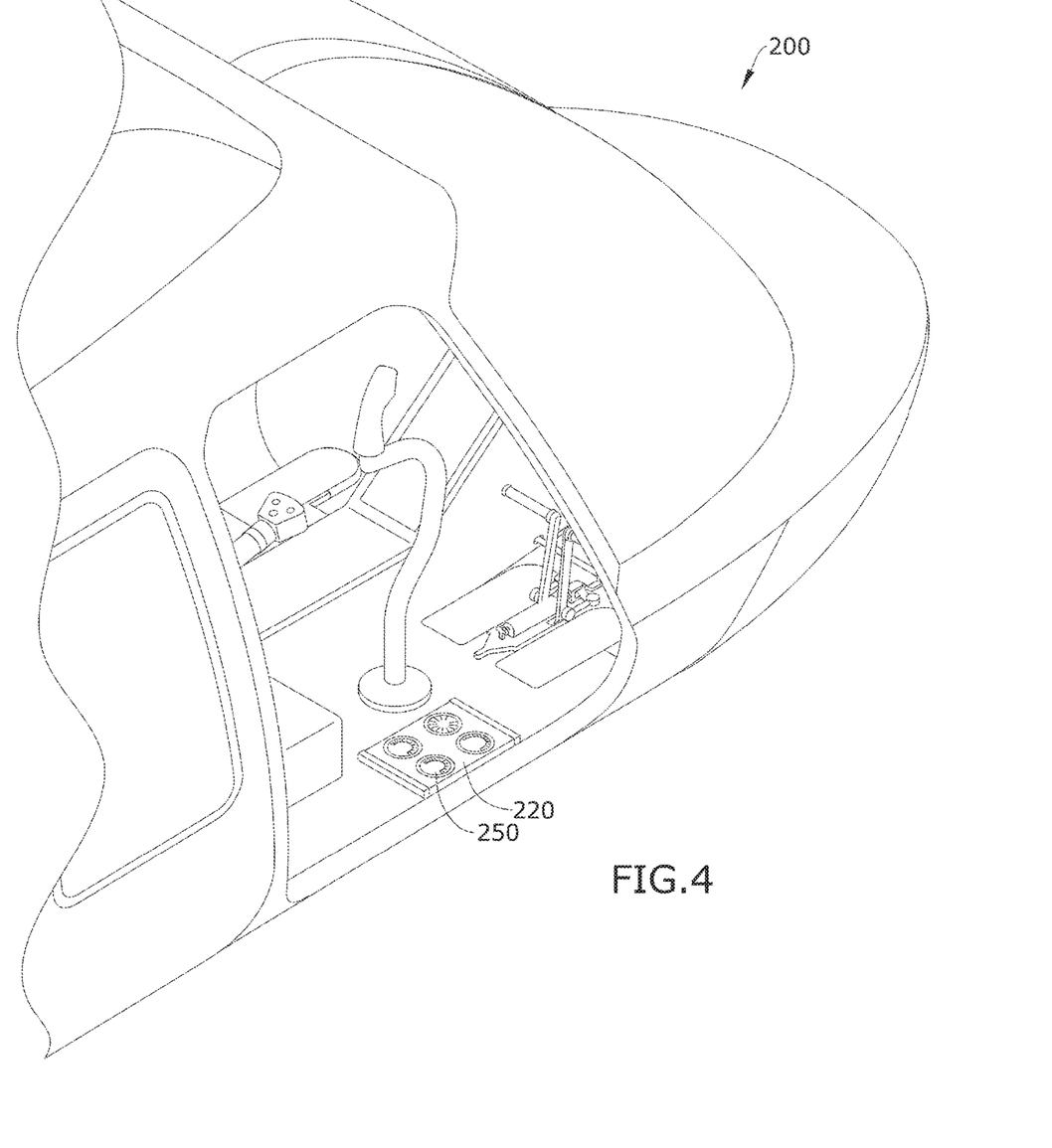
FIG. 4 conceptually illustrates a view of a tablet computing device and screen on which digital gauge graphics are visual output during external load operations of an exemplary helicopter that includes the helicopter gauge data collection, wireless distribution, and real-time visual display system in some embodiments.

By way of another example, FIG. 4 conceptually illustrates a view of a tablet computing device 220 and screen on which a custom tablet app is displayed with digital gauge graphics 250 being visual output during external load operations of an exemplary helicopter 200 that includes the helicopter gauge data collection, wireless distribution, and real-time visual display system.

Figure 5:
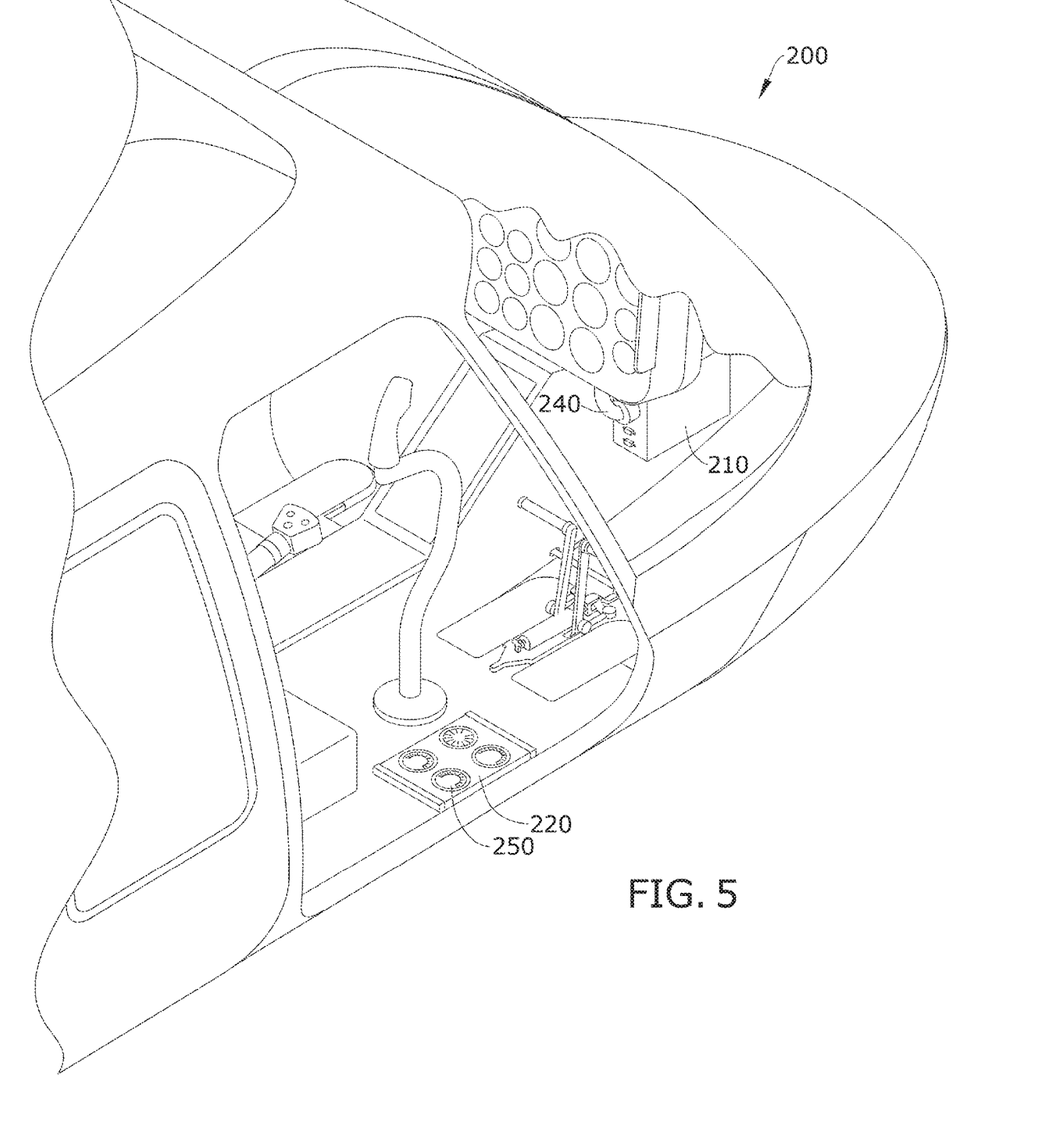
FIG. 5 conceptually illustrates a combined view of the data collection system and the tablet computing device and screen in some embodiments of the helicopter gauge data collection, wireless distribution, and real-time visual display system deployed in the exemplary helicopter.

To better illustrate the recommended position the tablet computing device 220 in relation to the data collection system 210, FIG. 5 conceptually illustrates a combined view of the data collection system and the tablet computing device 220 and screen of the helicopter gauge data collection, wireless distribution, and real-time visual display system deployed in the exemplary helicopter 200. As noted above, the tablet computing device 220 and the data collection system 210 are communicably connected via wireless Bluetooth connection. Bluetooth communication generally has an effective range of at least thirty feet (30 ft.) and can extend to over a hundred feed (>100 ft.) with supported Bluetooth modules and sufficient power. As shown in this Figure, the distance between the tablet computing device 220 and the data collection system 210 is far less than thirty feet. Thus, a key benefit achieved by deployed the tablet computing device 220 in connection with the data collection system 210 in a helicopter is the relative ability to position the real-time gauge displays wherever the pilot can see them during external load operations or other situations in which the pilot cannot see some or all of the instrument panel. In this way, the pilot can ensure that the helicopter does not exceed operating limits, no matter how difficult it is to see the instrument panel.

In some embodiments, additional data collected by the data collection system can be stored on SD card at the data collection system. In some embodiments, additional data that is already collected by the data collection system could also be displayed on the screen of the tablet via the custom tablet app. Examples of additional data that is collected and can be displayed include, without limitation, data for engine cycle counting as tallied by the engine cycle counting module of the software running on the data collection system, exceedance data collected by the data collection system, and/or post flight data in the form of a graph (or other manner of display) when represented as graphed data for visual output onto the screen of the tablet computing device.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, insertable memory modules or flash drives (e.g., SD cards, mini-SD cards, micro-SD cards, etc.), RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
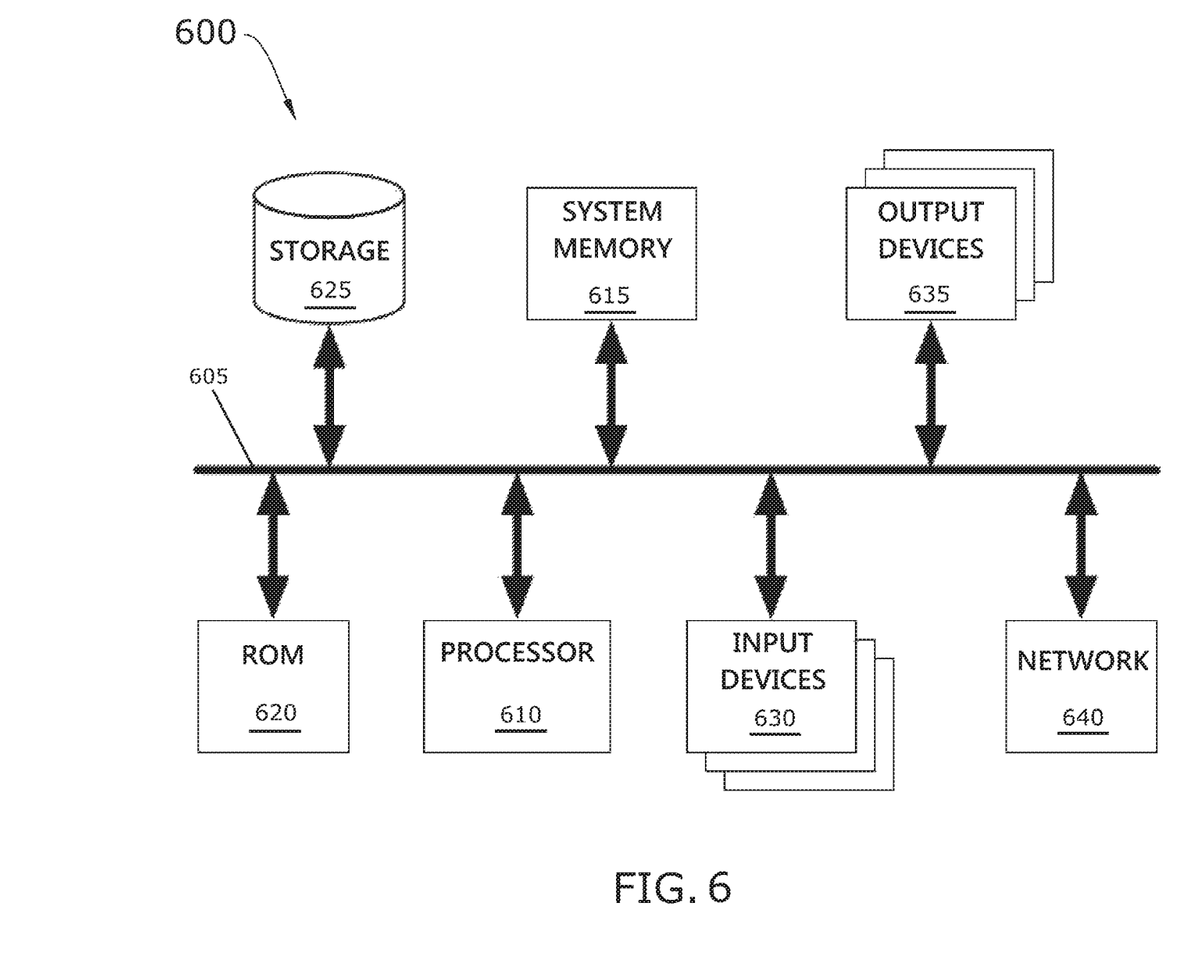
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk, an internal solid state disk, an external solid state disk with physical cable connection (not shown in this figure), and other such permanent storage disks, and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at run-time. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing or cursor control devices. The output devices 635 display images generated by the electronic system 600. The output devices 635 include printers and display devices, such as liquid crystal displays (LCD) or organic light emitting diode (OLED) displays. Some embodiments include a touchscreen that functions as both an input and output device, such as the tablet computing device 220 of the present disclosure, which includes a display screen that includes touch-sensitive technology that enables the screen to act as both an input device and an output device.

Finally, as shown in FIG. 6, bus 605 also couples electronic system 600 to a network 640 through a network adapter (not shown), which includes any wireless network adapter (WiFi) or local wireless adapter that is configured to work in conjunction with a particular wireless communication module, such as a Bluetooth antenna that is configured to send and receive wireless Bluetooth digital data signals between two or more Bluetooth modules, including the data collection system 210 and the tablet computing device 220 described in this disclosure. In this manner, the computer can be a part of a network of computers (such as a local area network ("LAN"), a wide area network ("WAN"), or an Intranet), or a network of networks (such as the Internet), or local group of devices (such as Bluetooth connected devices, including the tablet computing device 220 and the data collection system 210 of the present disclosure). In some embodiments, the bus 605 couples the electronic system 600 to a wireless communication network 640 through a wireless communication standard implemented by, for example, satellite communication standards and hardware (e.g., satellite communication chip(s) and antennae, etc.), cellular communication standards and hardware (e.g., cellular or mobile wireless communication chip(s) and antennae, etc.).

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by sets of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, flash memory (e.g., SD cards, mini-SD cards, micro-SD cards, etc.), magnetic and/or solid state hard drives, read-only drives, or other optical or magnetic media. The computer-readable media may store a computer program, such as the custom tablet app described in this specification as providing the visual output to the screen of the tablet computing device 220 to display real-time helicopter drive train based data streamed from the data collection system 210, and as received by the data collection system 210 when interfaced with the drive train of the exemplary helicopter 200. The computer program stored on the computer-readable media is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter, and mobile apps and mobile tablet computing devices apps that are executed on one or more processing units of a mobile device, such as a smart phone, a tablet computing device, a custom-built mobile device, and/or another type of mobile device.

While the invention has been described with reference to numerous specific details, one of ordinary skill in the art will recognize that the invention can be embodied in other specific forms without departing from the spirit of the invention. For instance, FIG. 1 conceptually illustrates a process. The specific operations of the process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A non-transitory computer readable medium storing a custom tablet application program which, when executed by a processor of a tablet computing device in wireless connection with a data collection system of a helicopter, prevents a helicopter pilot from exceeding operating limits due to limited viewing of native helicopter instrument panels by providing real-time helicopter gauge data in digital form on a screen of the tablet computing device during external load operations, said custom tablet application program comprising sets of instructions for:
   receiving a stream of digital helicopter operating data;
   transforming the digital helicopter operating data to visual representations of digitized helicopter gauges; and
   visually outputting dial and needle representations of the digitized gauges with the needle dynamically moving in real-time to point to gauge readings of the digital helicopter operating data shown in real-time in the digitized gauges.

2. A non-transitory computer readable medium storing a custom tablet application program which, when executed by a processor of a tablet computing device in wireless connection with a data collection system of a helicopter, prevents a helicopter pilot from exceeding operating limits due to limited viewing of native helicopter instrument panels by providing real-time helicopter gauge data in digital form on a screen of the tablet computing device during external load operations, said custom tablet application program comprising sets of instructions for:
   receiving a stream of digital helicopter operating data;
   transforming the digital helicopter operating data to visual representations of digitized helicopter gauges; and
   visually outputting the digitized gauges with the digital helicopter operating data dynamically displayed in real-time as gauge readings of the digitized gauges, wherein the gauge readings of a particular digitized gauge is displayed as a gauge dial that points to dynamically fluctuating gauge values along the particular digitized gauge.

3. The non-transitory computer readable medium of claim 1, wherein the custom tablet application program further comprises a set of instructions for initiating a wireless Bluetooth handshake connection with a data collection system that interfaces with a drive train of the helicopter to collect control variable data.

4. The non-transitory computer readable medium of claim 3, wherein the custom tablet application program further comprises a set of instructions for opening a new data stream over the wireless Bluetooth connection with the data collection system.

5. The non-transitory computer readable medium of claim 4, wherein the control variable data comprises digital control variable data that is wirelessly transmitted as the stream of digital helicopter operating data.

6. The non-transitory computer readable medium of claim 4, wherein the control variable data comprises analogue control variable data.

7. The non-transitory computer readable medium of claim 5, wherein the analogue control variable data is converted by the data collection system to a digital format and is wirelessly transmitted as the stream of digital helicopter operating data.

8. A helicopter gauge data collection, wireless distribution, and real-time visual display system comprising:
   a data collection device that interfaces with and collects data from a drive train of a particular helicopter;
   a data collection Bluetooth module that is associated with the data collection device;
   a tablet computing device comprising a tablet screen, a tablet processor, and a custom tablet app that represents digital helicopter gauge data by visually outputting digitized helicopter gauges that dynamically display the digital helicopter gauge data in real-time when a pilot of the particular helicopter is performing external load operations, wherein each digitized helicopter gauge comprises a dial and a needle, wherein the needle dynamically moves to point to differing gauge data values displayed around the dial in coordination with dynamically changing data collected from the drive train by the data collection device; and
   a data recipient Bluetooth module that is embedded in the tablet computing device and connects to the data collection Bluetooth module to receive a stream of the digital helicopter gauge data when the data collection device wirelessly transmits the collected data via the data collection Bluetooth module.

9. The helicopter gauge data collection, wireless distribution, and real-time visual display system of claim 8, wherein the data collection system comprises a physical data transmission wire that physically connects to the drive train of the particular helicopter to collect the data from the drive train of the particular helicopter.

10. The helicopter gauge data collection, wireless distribution, and real-time visual display system of claim 8, wherein the tablet computing device is a mobile tablet computing device that is not permanently mounted to the particular helicopter to allow the pilot to position the tablet computing device anywhere the tablet screen is within a field of view of a line of sight of the pilot when performing external load operations.

* * * * *